United States Patent
Ookoba et al.

(10) Patent No.: US 11,890,746 B2
(45) Date of Patent: Feb. 6, 2024

(54) LOAD REDUCTION DEVICE, LOAD REDUCTION METHOD, AND STORAGE MEDIUM STORING PROGRAM

(71) Applicant: NEC Corporation, Tokyo (JP)

(72) Inventors: Tadashi Ookoba, Tokyo (JP); Hisashi Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 360 days.

(21) Appl. No.: 17/292,481

(22) PCT Filed: Nov. 8, 2019

(86) PCT No.: PCT/JP2019/043820
§ 371 (c)(1),
(2) Date: May 10, 2021

(87) PCT Pub. No.: WO2020/100730
PCT Pub. Date: May 22, 2020

(65) Prior Publication Data
US 2022/0016785 A1 Jan. 20, 2022

(30) Foreign Application Priority Data
Nov. 12, 2018 (JP) .................. 2018-211993

(51) Int. Cl.
*B25J 11/00* (2006.01)
*B25J 13/08* (2006.01)

(52) U.S. Cl.
CPC ............. *B25J 11/00* (2013.01); *B25J 13/085* (2013.01); *B25J 13/088* (2013.01)

(58) Field of Classification Search
CPC ...... B25J 13/085; B25J 13/088; B25J 13/081; B25J 9/0006; B25J 11/00
See application file for complete search history.

(56) References Cited

U.S. PATENT DOCUMENTS

2006/0260620 A1* 11/2006 Kazerooni ........... A61B 5/1038
128/845
2008/0154165 A1* 6/2008 Ashihara .............. A61H 1/0262
623/24
(Continued)

FOREIGN PATENT DOCUMENTS

CN 104582668 A 4/2015
JP 2012125326 A 7/2012
(Continued)

OTHER PUBLICATIONS

International Search Report of PCT Application No. PCT/JP2019/043820 dated Jan. 7, 2020.
(Continued)

*Primary Examiner* — Adam R Mott
*Assistant Examiner* — Sagar Kc
(74) *Attorney, Agent, or Firm* — Sughrue Mion, PLLC (57) ABSTRACT

A ground reaction force load difference calculation unit configured to calculate a ground reaction force load difference that is an amount of a load relief for a user, on the basis of a first measured value that a weight, based on a weight of the user and a weight of the load reduction device that reduces a load on the user and has a mechanism that holds luggage and is at least worn by the user, is transmitted to a ground contact surface and of a second measured value that a weight based on the weight of the user is transmitted to the ground contact surface; and a torque control unit configured to control, on the basis of the ground reaction force load difference, torque that is output by the load reduction device to reduce the load on the user at an joint of each leg of the user.

7 Claims, 8 Drawing Sheets

(56) References Cited

U.S. PATENT DOCUMENTS

| | | | | |
|---|---|---|---|---|
| 2011/0266323 A1* | 11/2011 | Kazerooni | ............. | B25J 9/0006 224/575 |
| 2013/0226048 A1* | 8/2013 | Unluhisarcikli | ..... | A61H 1/0244 601/34 |
| 2016/0023350 A1* | 1/2016 | Holgate | .................... | A45F 3/10 901/1 |
| 2019/0184547 A1* | 6/2019 | Garrec | .................... | A61H 1/02 |

FOREIGN PATENT DOCUMENTS

| | | |
|---|---|---|
| JP | 2014068867 A | 4/2014 |
| JP | 2017136658 A | 8/2017 |

OTHER PUBLICATIONS

CN Office Action for CN Application No. 201980073430.7, dated Nov. 30, 2023 with English Translation.

\* cited by examiner

LOAD REDUCTION DEVICE, LOAD REDUCTION METHOD, AND STORAGE MEDIUM STORING PROGRAM

This application is a National Stage Entry of PCT/JP2019/043820 filed on Nov. 8, 2019, which claims priority from Japanese Patent Application 2018-211993 filed on Nov. 12, 2018, the contents of all of which are incorporated herein by reference, in their entirety.

TECHNICAL FIELD

The present invention relates to a load reduction device, a load reduction method, and a storage medium storing a program.

BACKGROUND ART

There is known a load reduction device that performs assistance of a load such as a walking motion of a user by being worn by the user and mitigates the load of luggage carried by the user. When wearable by a person, the load reduction device is sometimes called a powered suit.

Some powered suits assist walking movement by driving a link mechanism provided on the user's legs by outputting torque from an actuator to assist muscle strength. Patent Document 1 discloses a technique of calculating the torque value for driving an actuator based on the joint angle.

CITATION LIST

Patent Literature

Patent Document 1

Japanese Unexamined Patent Application Publication No. 2017-136658

SUMMARY OF THE INVENTION

Problems to be Solved by the Invention

In a load reduction device such as a powered suit, it is necessary to sequentially change the torque required for load reduction according to the momentum of the user's motion. As such, in a load reduction device, it is desired to perform more appropriate load reduction for motions of a user.

Therefore, an example object of the present invention is to provide a load reduction device, a load reduction method, and a storage medium storing a program, which can solve the above-mentioned problem.

Means for Solving the Problems

According to a first aspect of the present invention, a load reduction device includes a ground reaction force load difference calculation unit configured to calculate a ground reaction force load difference that is an amount of a load relief for a user, on the basis of a first measured value that a weight, based on a weight of the user and a weight of the load reduction device that reduces a load on the user and has a mechanism that holds luggage and is at least worn by the user, is transmitted to a ground contact surface and of a second measured value that a weight based on the weight of the user is transmitted to the ground contact surface; and a torque control unit configured to control, on the basis of the ground reaction force load difference, torque that is output by a drive mechanism of the load reduction device to reduce the load on the user at an joint of each leg of the user.

According to a second aspect of the present invention, a load reduction method includes calculating a ground reaction force load difference that is an amount of a load relief for a user, on the basis of a first measured value that a weight, based on a weight of the user and a weight of a load reduction device that reduces a load on the user and has a mechanism that holds luggage and is at least worn by the user, is transmitted to a ground contact surface and of a second measured value that a weight based on the weight of the user is transmitted to the ground contact surface; and controlling, on the basis of the ground reaction force load difference, torque that is output by a drive mechanism of the load reduction device to reduce the load on the user at a joint of each leg of the user.

According to a third aspect of the present invention, a program stored in a storage medium causes a computer of a load reduction device to execute processes, the processes includes calculating a ground reaction force load difference that is an amount of a load relief for a user, on the basis of a first measured value that a weight, based on a weight of the user and a weight of the load reduction device that reduces a load on the user and has a mechanism that holds luggage and is at least worn by the user, is transmitted to a ground contact surface and of a second measured value that a weight based on the weight of the user is transmitted to the ground contact surface; and controlling, on the basis of the ground reaction force load difference, torque that is output by a drive mechanism of the load reduction device to reduce the load on the user at a joint of each leg of the user.

Advantageous Effects of Invention

The present invention can provide a load reduction device capable of more appropriate load reduction for a user's motion.

EXAMPLE EMBODIMENT

Hereinbelow, a load reduction device, a load reduction method, and a storage medium storing a program according to an embodiment of the present invention will be described with reference to the drawings.

Figure 1:
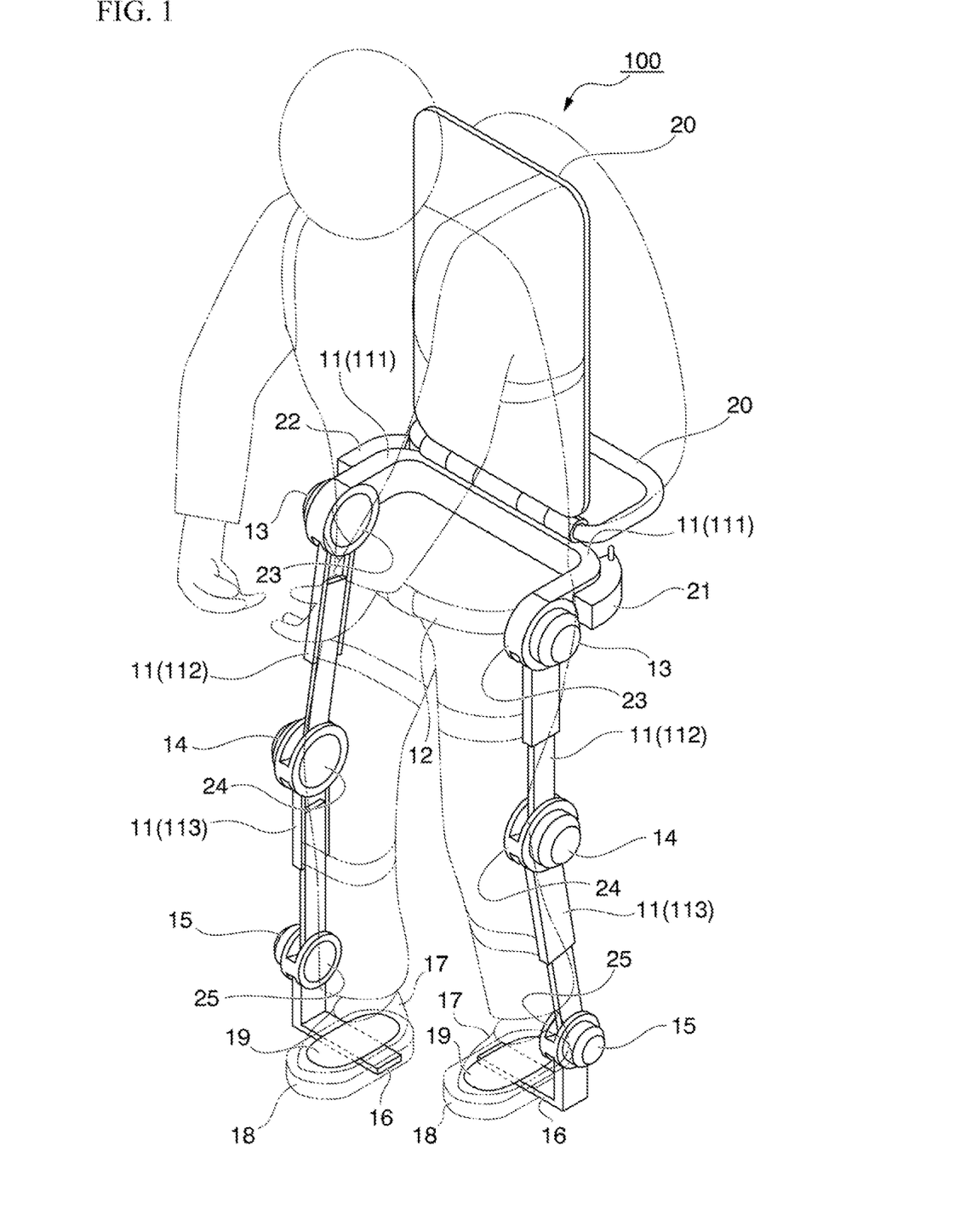
FIG. 1 is a diagram showing a configuration of a powered suit according to an embodiment of the present invention.

FIG. 1 is a diagram showing a configuration of a powered suit according to the present embodiment.

A powered suit 100 is an aspect of the load reduction device. The powered suit 100 is constituted by a skeleton portion 11, a belt 12, a hip actuator 13, a knee actuator 14, an ankle actuator 15, a shoe sole plate 16, a foot harness 17, a shoe sole load sensor 18 (first measuring unit), a foot sole load sensor 19 (second measuring unit), a loading platform 20, a control device 21, a battery 22, a hip joint sensor 23, a knee joint sensor 24, an ankle joint sensor 25, and the like. The skeleton portion 11 is roughly classified into a first skeleton portion 111, a second skeleton portion 112, and a third skeleton portion 113 as an example.

As shown in FIG. 1, the powered suit 100 is in one example configured as follows so as to support the loading platform 20, which is one aspect of a mechanism for holding luggage. That is, the powered suit 100 is provided with the first skeleton portion 111, and at the left and right hip actuators 13 are coupled rotatable to the first skeleton portion 111 and the second skeleton portion 112, which corresponds to the left or right thigh portion of the user wearing the powered suit 100, respectively. The left and right knee actuators 14 couple rotatable the corresponding second skeleton portion 112 on the left or right side and the corresponding third skeleton portion 113 along the left or right lower leg portion of the user wearing the powered suit 100. The ankle actuators 15 couple rotatable to the corresponding third skeleton portion 113 on the left or right side, and a corresponding shoe sole plate 16 provided on the underside of the foot harness 17 on the left or right side of the user wearing the powered suit 100. The hip actuator 13, the knee actuator 14, and the ankle actuator 15 are drive mechanisms that output torques that reduce the load on the user at each joint of each leg of the user.

The hip joint sensor 23 is installed in the hip actuator 13, and detects the hip joint angle, that is, the angle formed between the first skeleton portion 111 and the second skeleton portion 112, by an encoder. The knee joint sensor 24 is installed in the knee actuator 14, and detects the knee joint angle, that is, the angle between the second skeleton portion 112 and the third skeleton portion 113, by the encoder. The ankle joint sensor 25 is installed in the ankle actuator 15, and detects the ankle joint angle, that is, the angle between the third skeleton portion 113 and the shoe sole plate 16, by the encoder. The hip joint sensor 23, the knee joint sensor 24, and the ankle joint sensor 25 detect the angle of each joint of each leg of the user (hereinafter referred to as the "joint angle").

The user who wears the powered suit 100 attaches his/her left and right feet to the corresponding foot harnesses 17, and fixes the first skeleton portion 111 to the waist with the belt 12 so that the first skeleton portion 111 is closely attached to the waist. The powered suit 100 has a structure in which most of the load of the luggage and the load of the powered suit 100 is released to the ground surface in contact with the soles of the feet via the skeleton portion 11 and the hip actuator 13, the knee actuator 14, and the ankle actuator 15. The user turns on the control device 21 of the powered suit 100. The control device 21 controls the hip actuator 13, the knee actuator 14, and the ankle actuator 15 so as to transmit as much of the device weight as possible, which is the sum of the load of the luggage loaded on the loading platform 20 and the weight of the powered suit 100, to the walking surface via the skeleton portion 11 and the hip actuator 13, the knee actuator 14, and the ankle actuator 15. Thereby, the powered suit 100 mitigates the burden such as the load of the luggage on the user who wears the powered suit 100 and performs various operations.

Figure 2:
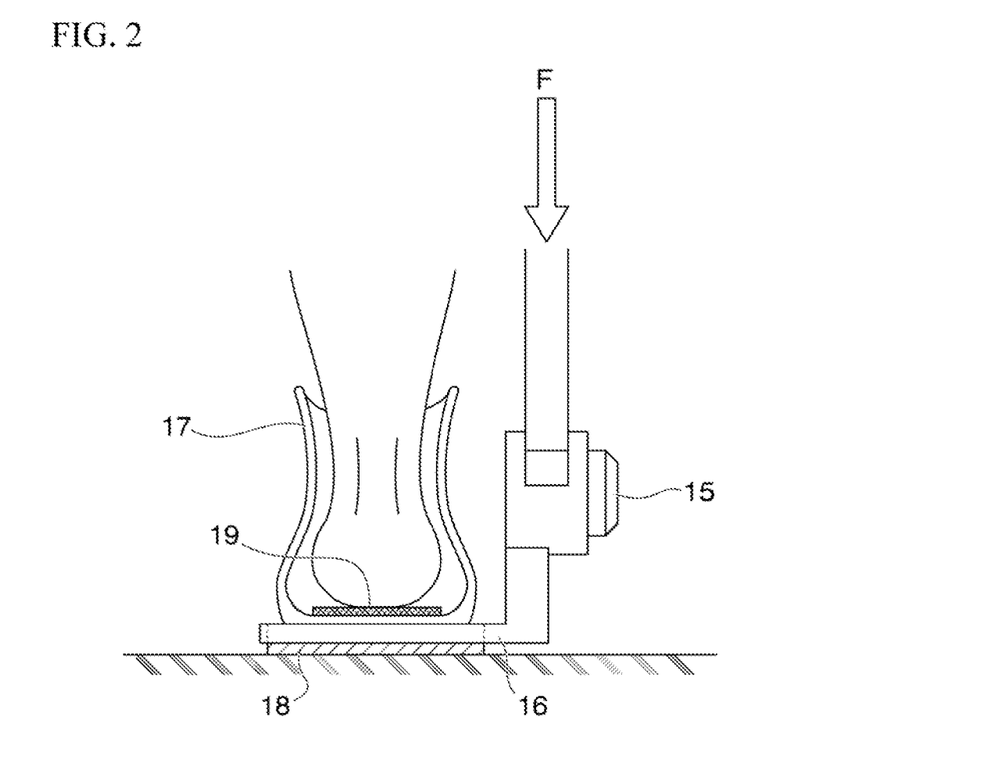
FIG. 2 is a first diagram showing an arrangement relationship between a shoe sole load sensor and a foot sole load sensor according to an embodiment of the present invention.

FIG. 2 is the first diagram showing the arrangement relationship between the shoe sole load sensor and the foot sole load sensor.

Figure 3:
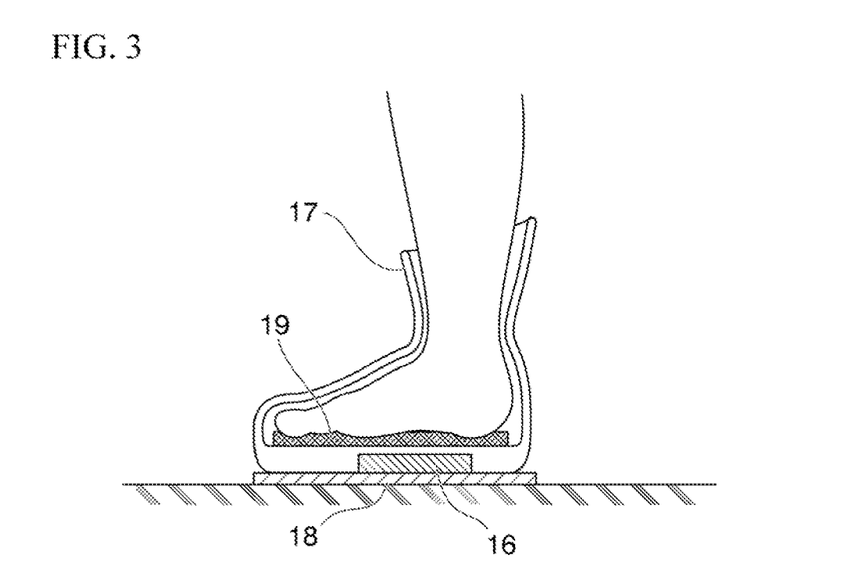
FIG. 3 is a second diagram showing an arrangement relationship between a shoe sole load sensor and a foot sole load sensor according to an embodiment of the present invention.

FIG. 3 is a second diagram showing the arrangement relationship between the shoe sole load sensor and the foot sole load sensor.

FIG. 2 shows a view when the foot harness 17 and each sensor of the right foot of FIG. 1 are visually recognized from the heel direction. FIG. 3 shows a view when the foot harness 17 and each sensor of the right foot of FIG. 2 are visually recognized from the inner thigh direction. As shown in FIGS. 2 and 3, the shoe sole load sensor 18 is provided on the bottom (sole) of the foot harness 17 corresponding to the shoe worn by the user. The shoe sole load sensor 18 is provided on the ground contact surface side of the shoe sole plate 16, which transmits the weight F of the powered suit 100 and luggage to the ground contact surface, and the foot harness 17, which transmits the user's weight to the ground contact surface, so as to cover the entire back surface of the shoe sole plate 16 and the foot harness 17. The foot sole load sensor 19 is provided in the foot harness 17 so as to cover the entire surface of the sole so as to be able to measure the weight applied from the sole of the user. The foot sole load sensor 19 may be provided between the insole of the foot harness 17 and the shoe sole plate 16.

Figure 4:
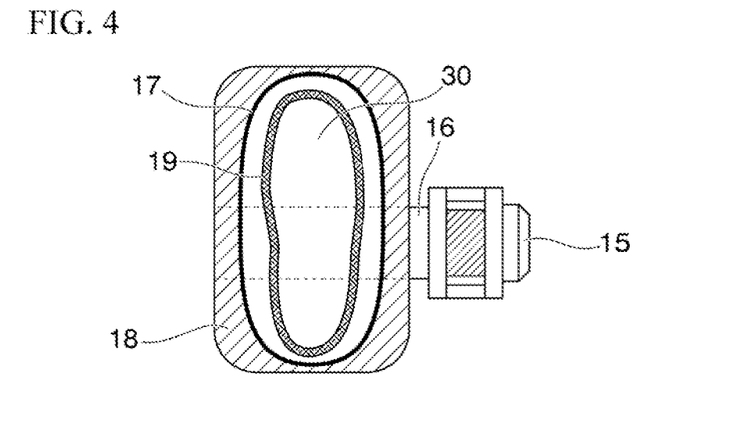
FIG. 4 is a diagram showing the relationship between the areas of the shoe sole load sensor and the foot sole load sensor according to an embodiment of the present invention.

FIG. 4 is a diagram showing the relationship between the areas of the shoe sole load sensor and the foot sole load sensor.

FIG. 4 is a view when the foot harness 17, the shoe sole load sensor 18, and the foot sole load sensor 19 are visually recognized from above. As shown in this figure, the shoe sole load sensor 18 has an area covering the entire ground contact surface (underside) of the foot harness 17 and the shoe sole plate 16. Further, the foot sole load sensor 19 is provided inside the foot harness 17 so as to cover the entire underside of the foot. As shown in FIG. 4, in one example the shoe sole plate 16 is provided so as to be sandwiched between the foot harness 17 and the shoe sole load sensor 18 in the width direction of the shoe sole load sensor 18.

Figure 5:
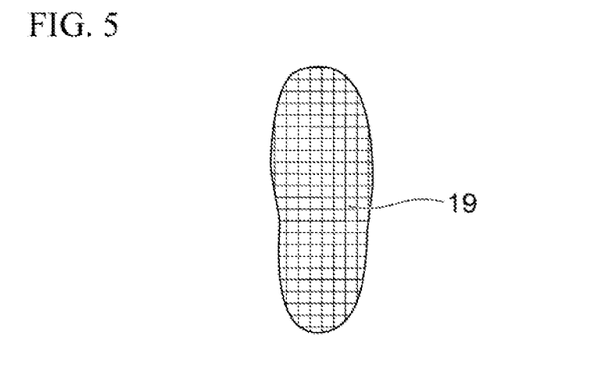
FIG. 5 is a diagram showing an outline of a load sensor according to an embodiment of the present invention.

FIG. 5 is a diagram showing an outline of the load sensor.

As shown by the example in FIG. 5, electrodes are arranged in a matrix on the front and back of a thin sheet-like insulator in the shoe sole load sensor 18 and the foot sole load sensor 19. The shoe sole load sensor 18 and the foot sole load sensor 19 measure the electrical resistance of the lattice points of the electrodes, and output the measured values to the control device 21. The control device 21 calculates the pressure applied to each lattice point and the load on the entire surface of the sensor sheet on the basis of the electrical resistance value of each lattice point. FIG. 5 shows the foot sole load sensor 19.

Figure 6:
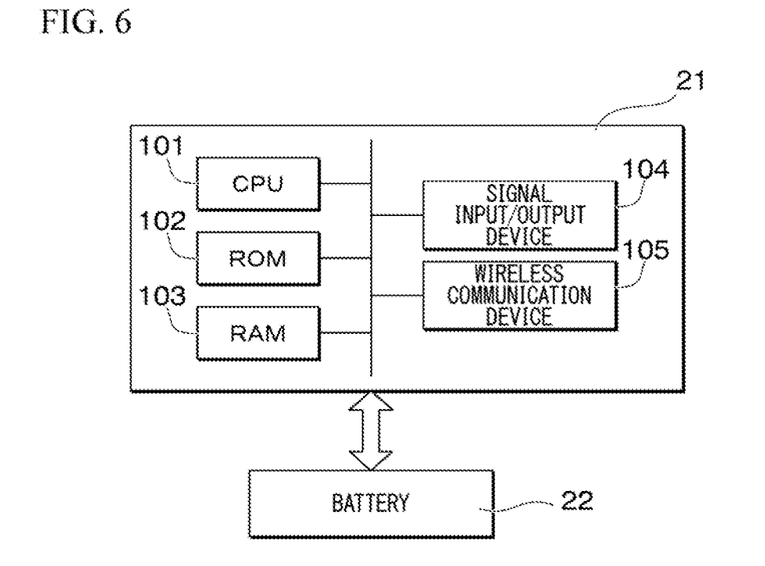
FIG. 6 is a diagram showing the hardware configuration of the control device according to an embodiment of the present invention.

FIG. 6 is a diagram showing the hardware configuration of the control device.

As shown in this figure, the control device 21 is a computer provided with hardware such as a CPU (Central Processing Unit) 101, a ROM (Read Only Memory) 102, a RAM (Random Access Memory) 103, a signal input/output device 104, and a wireless communication device 105.

The signal input/output device 104 inputs signals output from the shoe sole load sensor 18, the foot sole load sensor 19, the hip joint sensor 23, the knee joint sensor 24, and the ankle joint sensor 25. The signal input/output device 104 outputs control signals for controlling the hip actuator 13, the knee actuator 14, and the ankle actuator 15. The control device 21 operates by power supplied from the battery 22.

The wireless communication device 105 is communicatively connected with another device.

Figure 7:
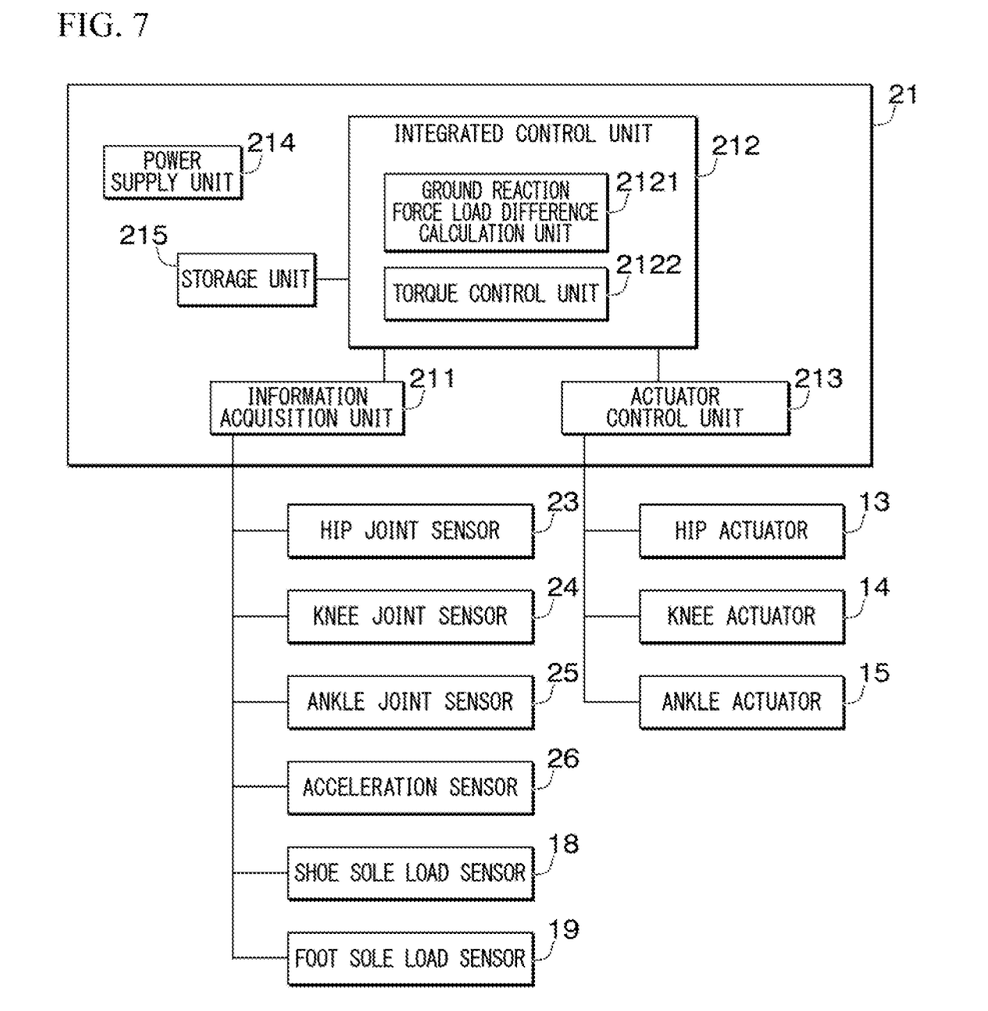
FIG. 7 is a function block diagram of the control device according to an embodiment of the present invention.

FIG. 7 is a function block diagram of the control device.

The control device 21 is activated based on the power supplied from the battery 22 when the power button is turned on. The control device 21 executes the control program after startup. As a result, the control device 21 is provided with at least the function configuration of an information acquisition unit 211, an integrated control unit 212, an actuator control unit 213, a power supply unit 214, and a storage unit 215. The information acquisition unit 211 acquires sensing information from the shoe sole load sensor 18, the foot sole load sensor 19, the hip joint sensor 23, the knee joint sensor 24, and the ankle joint sensor 25. The sensing information of the shoe sole load sensor 18 is shoe sole load information indicating the electrical resistance value corresponding to the pressure (load) at each lattice point described using FIG. 5. The sensing information of the foot sole load sensor 19 is the sole load information indicating the electrical resistance value corresponding to the pressure (load) of each lattice point. The sensing information of the hip joint sensor 23, the knee joint sensor 24, and the ankle joint sensor 25 is joint angle information indicating the detected joint angle.

The actuator control unit 213 controls the hip actuator 13, the knee actuator 14, and the ankle actuator 15.

When the power button is turned on, the power supply unit 214 supplies electric power from the battery 22 to each part of the control device 21.

The storage unit 215 stores an angle reference for each joint of the leg.

The integrated control unit 212 is provided with a ground reaction force load difference calculation unit 2121 and a torque control unit 2122.

The ground reaction force load difference calculation unit 2121 acquires a first measured value and a second measured value. The first measured value indicates a value at which a weight based on the weight of the powered suit 100 (load reduction device) and the weight of the user is transmitted to the ground contact surface. The powered suit 100 reduces the load on the user and is worn by at least the user. The second measured value indicates a value at which a weight based on the user's weight is transmitted to the ground contact surface.

The ground reaction force load difference calculation unit 2121 calculates the ground reaction force load difference, which is the amount of load from which the user is to be relieved, based on the first measured value and the second measured value. The first measured value is the shoe sole ground reaction force load based on the shoe sole load information detected by the shoe sole load sensor 18. The second measured value is the foot sole ground reaction force load based on the foot sole load information detected by the foot sole load sensor 19. Further, the ground reaction force load difference calculation unit 2121 calculates the ground reaction force load difference in a stance period by one foot after the landing of one foot in the gait cycle from the start to the end of the walking step.

The torque control unit 2122 controls the output torque output by the hip actuator 13, the knee actuator 14, and the ankle actuator 15. The torque control unit 2122 controls the output torque in order to reduce the load on the user at the leg joints of the user on the basis of the ground reaction force load difference calculated by the ground reaction force load difference calculation unit 2121 and each joint angle of each leg detected by the hip joint sensor 23, the knee joint sensor 24, and the ankle joint sensor 25. The torque control unit 2122 may control the output torque on the basis of the first measured value or the second measured value.

Next the operation of the control device 21 will be described in detail.

Figure 8:
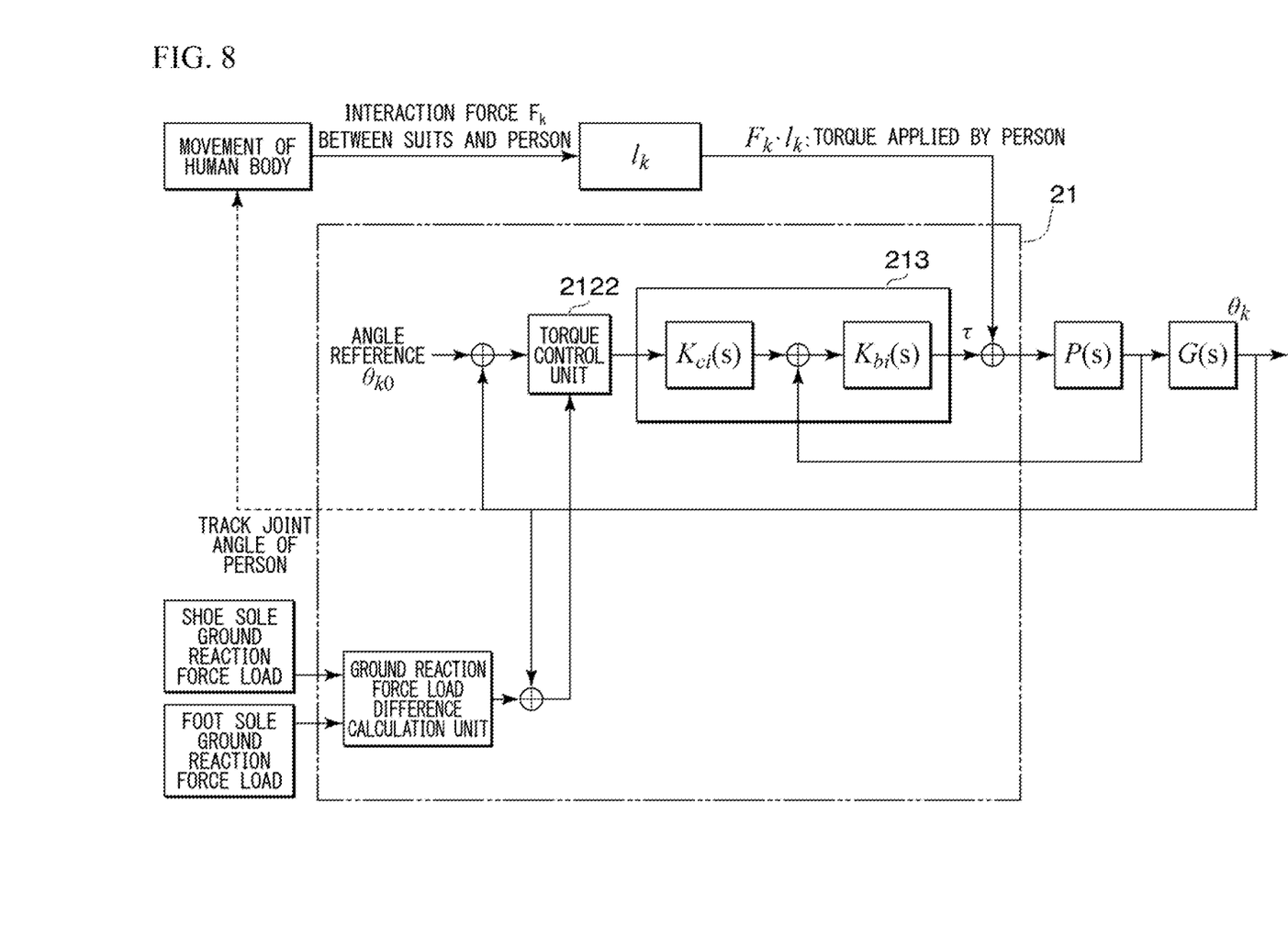
FIG. 8 is an operation block diagram showing an operation of the control device according to an embodiment of the present invention.

FIG. 8 is an operation block diagram showing the operation of the control device.

First, the ground reaction force load difference calculation unit 2121 calculates the ground reaction force load difference on the basis of the first measured value (shoe sole ground reaction force load) based on the shoe sole load information detected by the shoe sole load sensor 18, and the second measured value (foot sole ground reaction force load) based on the food sole load information detected by the foot sole load sensor 19.

The ground reaction force load difference calculation unit 2121 calculates, on the basis of the shoe sole load information, the first measured value (shoe sole ground reaction force load) applied to the shoe sole load sensor 18, which is provided on the ground contact surface side of the shoe sole plate 16 and the foot harness 17 of the powered suit 100. Specifically, the ground reaction force load difference calculation unit 2121 calculates the pressure applied to each lattice point and the load on the entire surface based on the electrical resistance value of each lattice point included in the shoe sole load information, and finds the first measured value (shoe sole ground reaction force load) applied to the shoe sole load sensor 18. The weight indicated by the first measured value is the weight, applied to the shoe sole load sensor 18, which is a composite weight F' during walking of the weight of the user, the weight of the powered suit 100, and the weight F of the luggage. More specifically, the first measured value is a value obtained by combining "the load (weight F of luggage)+the suit weight+the body weight+ force caused by acceleration, etc."

The ground reaction force load difference calculation unit 2121 calculates, on the basis of the foot sold load information, the second measured value (foot sole ground reaction force load) applied to the foot sole load sensor 19 inserted in the foot harness 17 of the powered suit 100. The second measured value (foot sole ground reaction force load) is the weight applied to the foot sole load sensor 19, which is a composite weight f of the weight of the user and the load on the user (the weight that could not escape to the ground contact surface via the skeleton portion 11 among the luggage and the weight of the power suit). Specifically, the ground reaction force load difference calculation unit 2121 calculates the pressure applied to each lattice point and the load on the entire surface based on the electrical resistance value of each lattice point included in the shoe sole load information, and finds the second measured value (foot sole ground reaction force load) applied to the foot sole load sensor 19. More specifically, the second measured value is a value obtained by combining "a part of the load (weight F of the luggage)+a part of the suit weight+(a part of) the body weight+a part of the force caused by the acceleration, etc."

The ground reaction force load difference calculation unit 2121 calculates the ground reaction force load difference by subtracting the second measured value from the first measured value. This ground reaction force load difference is the weight directly applied to the ground contact surface via the skeleton portion 11 among the weight of the luggage and the weight of the powered suit. Moreover, by subtracting a value based on the weight of the powered suit 100, the ground reaction force load difference calculation unit 2121 may calculate, among the weight of the luggage only, the weight directly applied via the skeleton portion 11 to the ground contact surface during walking by the user.

Figure 9:
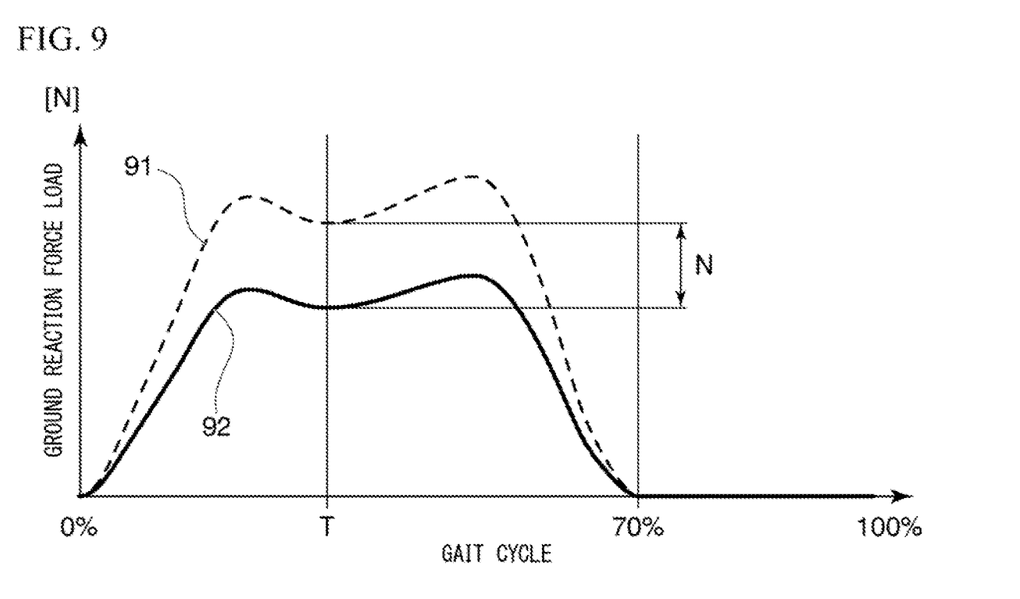
FIG. 9 is a diagram showing an example of a floor reaction force load difference according to an embodiment of the present invention.

FIG. 9 is a diagram showing an example of a ground reaction force load difference.

In this figure, the broken line 91 is a graph showing the transition of the first measured value indicating the shoe sole ground reaction force load in the gait cycle in which the start to the end of a walking step of one leg of the user is treated as one unit. The solid line 92 is a graph showing the transition of the second measured value indicating the foot sole ground reaction force load in the gait cycle. In the graph, the horizontal axis shows the percentage of time elapsed from the start to the end of one walking step in the gait cycle.

In this gait cycle, the period from 0% to 70% in this gait cycle indicates a stance period during which a foot is placed on the ground contact surface (the leg is being a stance). The period from 70% to 100% in this gait cycle indicates a swing period in which no load is applied to the shoe sole load sensor 18 and the foot sole load sensor 19 due to the foot being separated from the ground contact surface (ground surface) (the leg is being a swing). In the graph, the vertical axis indicates the load. The ground reaction force load difference calculation unit 2121 calculates the ground reaction force load difference N by subtracting the second measured value at the time point T from the first measured value at any time point T in the stance period.

The ground reaction force load difference calculation unit 2121 calculates the ground reaction force load difference between the left and right feet by the above processing. The ground reaction force load difference calculation unit 2121 outputs the calculated ground reaction force load difference of both feet to the torque control unit 2122.

The torque control unit 2122 performs the following series of processes using the current first measured value detected by the shoe sole load sensor 18, the current second measured value detected by the foot sole load sensor 19, the input ground reaction force load difference, the angle reference $\theta_{k0}$ at each joint, and the current joint angle $\theta_{k0}$ detected by each of the hip joint sensor 23, knee joint sensor 24, and ankle joint sensor 25 of each leg. That is, the torque control unit 2122 detects characteristics of the user's motion at the present time in real time, and sequentially estimates the motion of the powered suit 100 using an internally built-in overall motion estimation model of the powered suit 100. Then, the torque control unit 2122 calculates the target value of the torque output by the hip actuator 13, the knee actuator 14, and the ankle actuator 15. That is, the torque control unit 2122 uses the current first measurement value, the current second measurement value, the ground reaction force load difference, the angle reference $\theta_{k0}$ of each joint, and the current joint angle $\theta_k$ of each joint of each leg, calculates the target value of the torque output by the hip actuator 13, the knee actuator 14, and the ankle actuator 15 of each leg on the basis of a preset motion estimation model.

For example, the torque control unit 2122 calculates the target value of torque assuming that the ground reaction force load difference is reduced by the powered suit 100. Further, the torque control unit 2122 may determine whether each leg is in the swing state or the stance state by using the first measured value or the second measured value. The torque control unit 2122 may calculate the output torque at each joint of each leg by using each joint angle based on the motion estimation model at the time of a swing or the motion estimation model at the time of a stance. The torque control unit 2122 outputs the calculated target value of the torque of the hip actuator 13, the knee actuator 14, and the ankle actuator 15 of each leg to the actuator control unit 213.

The actuator control unit 213 controls the rotation angles of the hip actuator 13, the knee actuator 14, and the ankle actuator 15 with an angle controller $K_{ci}(s)$ on the basis of the target value of each torque. "s" indicates the frequency domain of the control system. Subsequently, the actuator control unit 213 calculates the torque i at the current timing in relation to the hip actuator 13, the knee actuator 14, and the ankle actuator 15 of each leg by a force controller $K_{bi}(s)$, and outputs a signal indicating each torque i to each of these actuators.

Thereby, the interaction force $F_k$ between suits and person applied by the user in the kth of the time series (current value), the torque $l_k$ applied by the user, and the output torque i become the dynamics P(s) of each actuator. The hip joint sensor 23, the knee joint sensor 24, and the ankle joint sensor 25 detect each joint angle $\theta_k$ in the kth of the time series in accordance with the dynamics G(s) of the powered suit 100 based on the dynamics P(s) of the hip actuator 13, the knee actuator 14, and the ankle actuator 15. Then, the control device 21 repeats the above-described processing.

Note that the actuator control unit 213 calculates the torque i using the following torque calculation formula as an example. In this torque calculation formula (1), "(θ)/G(s)" indicates a feedback factor to the actuator control unit 213. "$F_k \cdot l_k$" indicates a feedforward factor. $T_i$ indicates the target value of the torque calculated by the torque control unit. f(θ) indicates a function including an angle θ based on the angle reference of the hip actuator 13, the knee actuator 14, and the ankle actuator 15. The torque calculation formula below is an example, and a formula other than the torque calculation formula shown below may be used. In the torque calculation formula (1), "s" indicates the frequency domain of the control system, $K_{bi}$ indicates the control model of the force controller, and $K_{ci}$ indicates the control model of the angle controller.

$$\tau = K_{bi}(s)\{K_{ci}(s) - f(\theta)/G(s) + F_k \cdot l_k\} \qquad (1)$$

Figure 10:
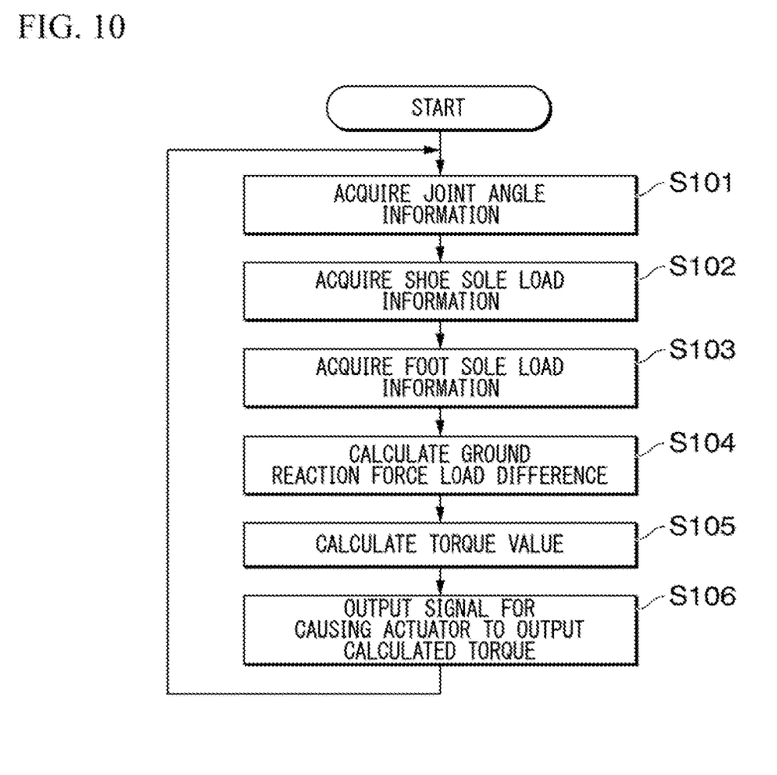
FIG. 10 is a diagram showing the processing flow of the powered suit according to an embodiment of the present invention.

FIG. 10 is a flowchart showing the processing of the powered suit.

First, the user wears the powered suit 100. At this time, the user inserts the foot sole load sensor 19 inside the foot harness 17. The foot sole load sensor 19 may be provided inside the foot harness 17 in advance. As the area of the foot sole load sensor 19, a size suitable for the size of the user's foot may be used. Further, the user attaches the shoe sole load sensor 18 to the ground contact surface side of the foot harness 17 or the shoe sole plate 16 of the powered suit 100. The shoe sole load sensor 18 may also be provided in advance on the ground contact surface side of the foot harness 17 or the shoe sole plate 16. As the area of the shoe sole load sensor 18, a size suitable for the foot harness 17 corresponding to the size of the user's foot may be used.

The user operates the power button of the control device 21 provided in the powered suit 100 to turn on the power. As a result, the control device 21 is started. The user performs motions such as walking, running, leaping, and jumping while wearing the powered suit 100. The user may load luggage on the loading platform 20 of the powered suit 100 and perform operations such as walking, running, leaping, and jumping. The actuator control unit 213 of the control device 21 controls the hip actuator 13, the knee actuator 14, and the ankle actuator 15 so as to reduce the load on the user due to the weight of the luggage or the powered suit 100. Thereby, the powered suit 100 tracks various motions of the user.

While the control device 21 is being driven, the information acquisition unit 211 acquires joint angle information from the hip joint sensor 23, the knee joint sensor 24, and the ankle joint sensor 25 at predetermined intervals (Step S101). While the control device 21 is being driven, the information acquisition unit 211 acquires shoe sole load information from the shoe sole load sensor 18 at a predetermined interval (Step S102). Further, while the control device 21 is being driven, the information acquisition unit 211 acquires foot sole load information from the foot sole load sensor 19 at a predetermined interval (Step S103). As described above, the shoe sole load information and the foot sole load information are electrical resistance values corresponding to the pressures (loads) at the respective lattice points of the shoe sole load sensor 18 and the foot sole load sensor 19. The predetermined interval is, for example, every short time such as every 10 milliseconds.

The ground reaction force load difference calculation unit 2121 calculates the ground reaction force load difference by subtracting the second measured value (foot sole ground reaction force load) indicated by the foot sole load information from the first measured value (shoe sole ground reaction force load) indicated by the shoe sole load information (Step S104). The torque control unit 2122 calculates the target value of the torque output by the hip actuator 13, the knee actuator 14, and an ankle actuator 15 of each leg based on the first measured value, the second measured value, the ground reaction force load difference, the angle reference of each joint, and the joint angle of each join (Step S105).

The actuator control unit 213 outputs, to each actuator, a signal (t) for causing the hip actuator 13, the knee actuator 14, and the ankle actuator 15 of each leg to output each torque of the target value of the torque calculated by the torque control unit 2122 (Step S106). After that, the processing returns to the process of Step S101, and the control device 21 repeats the processes from steps S101 to S106 until the processing is completed.

According to the above processing, the torque output by the hip actuator 13, the knee actuator 14, and the ankle actuator 15 is controlled on the basis of the ground reaction force load difference obtained by subtracting the second measured value in which the weight based on the weight of the user is transmitted to the ground contact surface, from the first measured value in which the weight, based on the weight of the powered suit 100 and the weight of the user, is transmitted to the ground contact surface. As a result, the control device 21 of the powered suit 100 can directly control the load reduction in consideration of the load relief amount for the user (the state in which the load is reduced by the powered suit 100). Therefore, more appropriate user load reduction can be realized.

Further, when a device other than the powered suit 100 performs the above-mentioned processing, the real-time property may be impaired due to a delay in data transmission/reception. However, in the present embodiment, since the control device 21 included in the powered suit 100 executes the above-mentioned processing, it is possible to respond to a sudden operation of the user without delay.

Although the embodiment of the present invention has been described above, the shoe sole load sensor 18 may be provided in advance on the ground contact surface side of the shoe sole plate 16 of the powered suit 100. Also, the foot sole load sensor 19 may be inserted in advance inside the foot harness 17.

In the above description, it was shown that the shoe sole load sensor 18 has an area covering the entire underside of the foot harness 17, and the foot sole load sensor 19 has an area covering the entire underside of the foot in the foot harness 17. However, the shoe sole load sensor 18 may be capable of measuring the load applied to the ground contact surface from the shoe sole plate 16 or the foot harness 17 even when the position where the load is applied deviates.

For example, the shoe sole load sensor 18 may be a plurality of pressure sensors provided on the ground contact surface side of the shoe sole plate 16. Even if the load point on the ground contact surface of the shoe sole plate 16 moves over time, the plurality of pressure sensors sequentially measure the load at each load point, and output the shoe sole load information including the electrical resistance value corresponding to that load.

The foot sole load sensor 19 may also be composed of a plurality of pressure sensors. Even when the load position of the sole in the foot harness 17 moves with the passage of time, the plurality of pressure sensors sequentially measure the load and output the foot sole load information including the electric resistance value corresponding to the load.

The ground reaction force load difference calculation unit 2121 may calculate the first measured value, the second measured value, and the ground reaction force load difference based on the shoe sole load information and the foot sole load information obtained from these plurality of sensors.

The ground reaction force load difference calculation unit 2121 may calculate the load corresponding to the sensing information by machine learning based on past shoe sole load information and foot sole load information and store the load in the storage unit 215. In this case, the ground reaction force load difference calculation unit 2121 may read the loads (shoe sole ground reaction force load and foot sole ground reaction force load) corresponding to the electric resistance values indicated by the shoe sole load information and the foot sole load information from the storage unit 215 for use in calculation of the ground reaction force load difference.

The arrangement relationship between the shoe sole load sensor 18 and the foot sole load sensor 19 is not limited to the above.

Figure 11:
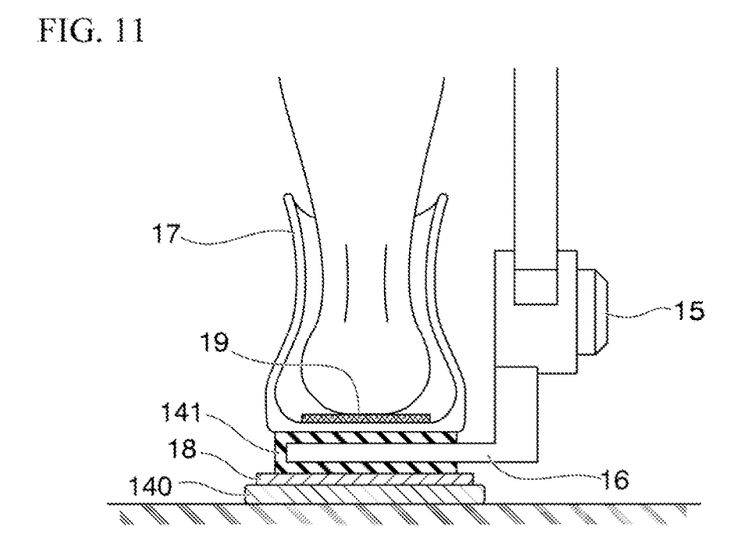
FIG. 11 is a diagram showing another arrangement example of the shoe sole load sensor and the foot sole load sensor according to an embodiment of the present invention.
Figure 12:
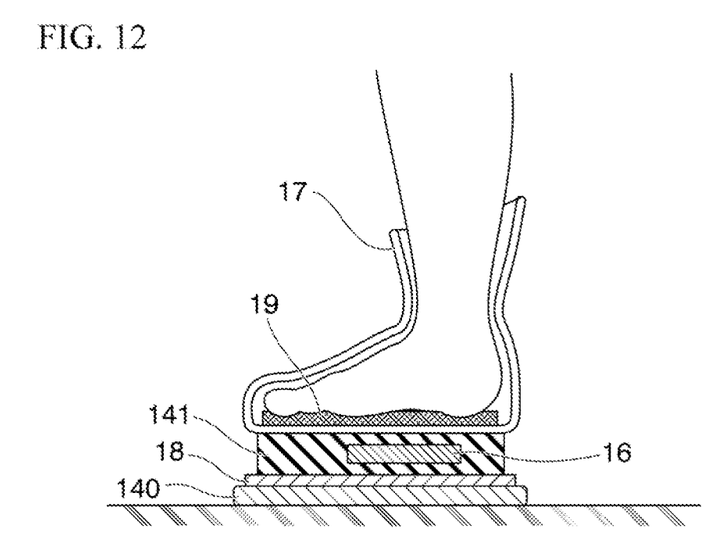
FIG. 12 is a diagram showing another arrangement example of the shoe sole load sensor and the foot sole load sensor according to an embodiment of the present invention.

FIGS. 11 and 12 are diagrams showing other arrangement examples of the shoe sole load sensor and the foot sole load sensor.

FIG. 11 shows a view when the foot harness 17 and each sensor of the right foot are visually recognized from the heel direction.

FIG. 12 shows a view when the foot harness 17 and each sensor of the right foot of FIG. 11 are visually recognized from the inner thigh direction.

These FIGS. 11 and 12 differ from FIGS. 2 and 3 in that a protective sheet 140 is provided so as to cover the entire underside of the shoe sole load sensor 18. Further, the shoe sole plate 16 is embedded in a sole 141 of the foot harness 17. Further, the ground contact portion of the foot harness 17 has a flatter shape. The protective sheet 140 is provided on the underside of the shoe sole load sensor 18. The protective sheet 140 may be provided so as to sandwich the shoe sole load sensor 18 vertically. By protecting the shoe sole load sensor with the protective sheet 140, the durability of the shoe sole load sensor 18 can be improved, and there is an effect that problems such as damage during measurement can be prevented.

Further, in the above example, the control device 21 is provided in the powered suit 100, but the present invention is not limited thereto, and another device that is communicatively connected with the powered suit 100 by wires or wirelessly may have the function of the control device 21.

Figure 13:
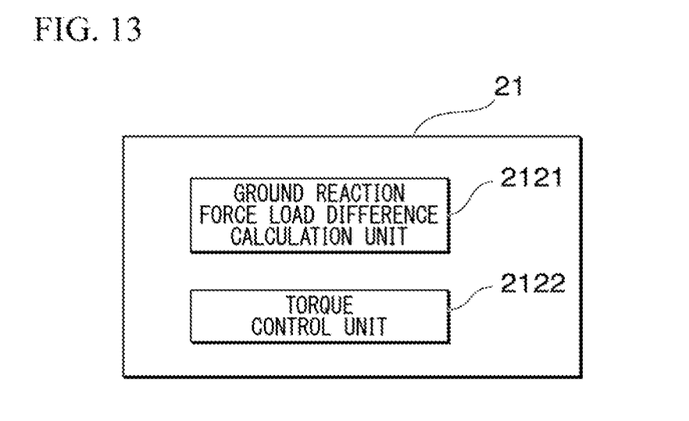
FIG. 13 is a diagram showing a minimum configuration of the control device according to an embodiment of the present invention.

FIG. 13 is a diagram showing the minimum configuration of the control device.

The minimum configuration of the load reduction device is the control device 21. The control device 21 may have at least the functions of the ground reaction force load difference calculation unit 2121 and the torque control unit 2122 described above.

The ground reaction force load difference calculation unit 2121 calculates a ground reaction force load difference, which is the amount of load from which the user is to be relieved, on the basis of a first measured value in which a weight, based on the weight of the load reduction device and the weight of the user, is transmitted to the ground contact surface, and a second measured value in which a weight based on the weight of the user is transmitted to the ground contact surface. The load reduction device reduces the load on the user and at least has a mechanism for holding the load worn by the user.

The torque control unit 2122 controls the output torque output by the hip actuator 13, the knee actuator 14, and the ankle actuator 15 in order to reduce the load on the user at the joints of the user's legs on the basis of the ground reaction force load difference calculated by the ground reaction force load difference calculation unit 2121.

The above-mentioned control device 21 may also be a computer provided with hardware such as the CPU (Central Processing Unit) 101, the ROM (Read Only Memory) 102, the RAM (Random Access Memory) 103, an HDD (Hard Disk Drive) 104, and the wireless communication device 105.

The control device 21 described above has a computer system inside. The process of each processing described above is stored in a computer-readable recording medium in the form of a program, with the process being performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

Further, the above-mentioned program may be for realizing some of the functions described above.

Moreover, the above-mentioned program may be a so-called differential file (differential program) that can realize the above-mentioned functions in combination with a program already recorded in the computer system.

Priority is claimed on Japanese Patent Application No. 2018-211993, filed Nov. 12, 2018, the content of which is incorporated herein by reference.

INDUSTRIAL APPLICABILITY

According to the present invention, it is possible to provide a load reduction device capable of more appropriate load reduction with respect to a user's motions.

REFERENCE SIGNS LIST

100: Powered suit
11: Skeleton portion
12: Belt
13: Hip actuator
14: Knee actuator
15: Ankle actuator
16: Shoe sole plate
17: Foot harness
18: Shoe sole load sensor
19: Foot sole load sensor
20: Loading platform
21: Control device
22: Battery
23: Hip joint sensor
24: Knee joint sensor
25: Ankle joint sensor
211: Information acquisition unit
212: Integrated control unit
2121: Ground reaction force load difference calculation unit
2122: Torque control unit
213: Actuator control unit
214: Power supply unit
215: Storage unit

What is claimed is:

1. A load reduction device comprising:
at least one memory configured to store instructions; and
at least one processor configured to execute the instructions to;
calculate a ground reaction force load difference that is an amount of a load relief for a user, on the basis of a first measured value indicating a value at which a weight based on a weight of the user and a weight of the load reduction device that reduces a load on the user and has a mechanism that holds luggage and is at least worn by the user, is transmitted to a ground contact surface and of a second measured value indicating a value at which a weight based on the weight of the user is transmitted to the ground contact surface; and
control, on the basis of the ground reaction force load difference, torque that is output by a drive mechanism of the load reduction device to reduce the load on the user at a joint of each leg of the user.

2. The load reduction device according to claim 1, wherein the at least one processor is configured to execute the instructions to:
acquire the first measured value from a first measuring unit that is provided on a sole of each shoe worn by the user and provided on a side of the ground contact surface of the shoe sole plate that transmits the weight of the load reduction device to the ground contact surface, and acquire the second measured value from a second measuring unit provided on the sole of each shoe worn by the user.

3. The load reduction device according to, claim 1, wherein the at least one processor is configured to execute the instructions to:
calculate the ground reaction force load difference when a leg is being a stance.

4. The load reduction device according to claim 1, wherein the at least one processor is configured to execute the instructions to:
  control the torque on the basis of an angle of each joint of a leg.

5. The load reduction device according to claim 1, wherein the at least one processor is configured to execute the instructions to:
  control the torque on the basis of the first measured value or the second measured value.

6. A load reduction method comprising:
  calculating a ground reaction force load difference that is an amount of a load relief for a user, on the basis of a first measured value indicating a value at which a weight based on a weight of the user and a weight of a load reduction device that reduces a load on the user and has a mechanism that holds luggage and is at least worn by the user, is transmitted to a ground contact surface and of a second measured value indicating a value at which a weight based on the weight of the user is transmitted to the ground contact surface; and
  controlling, on the basis of the ground reaction force load difference, torque that is output by a drive mechanism of the load reduction device to reduce the load on the user at a joint of each leg of the user.

7. A non-transitory computer-readable storage medium that stores a program that causes a computer of a load reduction device to execute processes, the processes comprising:
  calculating a ground reaction force load difference that is an amount of a load relief for a user, on the basis of a first measured value indicating a value at which a weight based on a weight of the user and a weight of the load reduction device that reduces a load on the user and has a mechanism that holds luggage and is at least worn by the user, is transmitted to a ground contact surface and of a second measured value indicating a value at which a weight based on the weight of the user is transmitted to the ground contact surface; and
  controlling, on the basis of the ground reaction force load difference, torque that is output by a drive mechanism of the load reduction device to reduce the load on the user at a joint of each leg of the user.

* * * * *